United States Patent [19]
Fielding et al.

[11] 3,992,224
[45] Nov. 16, 1976

[54] INHIBITION OF LIQUID AND VAPOR TRANSMISSION THROUGH PLASTIC-SUBSTRATE SEALS

[75] Inventors: Ivor R. Fielding, Naperville; Wassily Poppe, Lombard; Michael M. Schwartz, Aurora; James P. Whelan, West Chicago, all of Ill.

[73] Assignee: Standard Oil Company a corporation of Indiana, Chicago, Ill.

[22] Filed: Nov. 29, 1974

[21] Appl. No.: 528,415

[52] U.S. Cl. .............................. 29/623.5; 264/238; 264/272
[51] Int. Cl.² ..................... H01M 2/00; H01M 2/08
[58] Field of Search ............ 136/170, 133; 427/195; 428/458, 323, 474, 521

[56] References Cited
UNITED STATES PATENTS

| | | | |
|---|---|---|---|
| 3,449,145 | 6/1969 | Bloom et al. | 427/195 |
| 3,532,531 | 10/1970 | Stallard | 427/195 |
| 3,713,896 | 1/1973 | Feldhabe | 136/133 |
| 3,808,073 | 4/1974 | Navarre | 136/170 |
| 3,911,161 | 10/1975 | Nord | 427/195 |

*Primary Examiner*—John H. Mack
*Assistant Examiner*—H. A. Feeley
*Attorney, Agent, or Firm*—Wallace L. Oliver; Arthur G. Gilkes; William T. McClain

[57] ABSTRACT

Powder coating a substrate with a polyolefin or preferably a polyolefin-polycarbonamide blend before contacting the substrate with a plastic resin creating a plastic-substrate seal, inhibits liquid and vapor transmission through the seal. The application of this invention to battery terminal bushings prevents unsightly corrosion about the battery terminal which is caused by "wicking" of battery acid.

15 Claims, 3 Drawing Figures

INHIBITION OF LIQUID AND VAPOR TRANSMISSION THROUGH PLASTIC-SUBSTRATE SEALS

BACKGROUND OF THE INVENTION

This invention relates to inhibition of liquid and vapor transmission through a seal between a substrate, such as a metal or glass, and a plastic resin. Further, this invention relates to a process that inhibits liquid and vapor transmission through such seals and to specific articles formed using this process. More particularly, this invention relates to a powder coated metal object which is enclosed by a molded plastic unit and more specifically to a metal object that is powder coated with a polyolefin or a polyolefin-polycarbonamide blend.

The problem of liquid and vapor transmission through a metal plastic seal is exhibited in lead-acid batteries commonly used in motor vehicles. In one method of making lids which are used in the outer casing of such batteries, polypropylene is injection molded about lead terminal bushings which are positioned in the lid such that lead positive and negative terminal posts extending from the battery plates pass through the bushing during assembly of the battery. The bushings and posts are secured together by a lead on lead seal. After the assembled battery is charged with battery acid, the liquid and vapor can travel up a post by surface forces (wicking) and eventually can make contact with the seal between the polypropylene lid and the lead bushing. Often seepage occurs between the bushing and the lid, which leads to an unsightly corrosion about the battery terminals. Since this seepage and resulting corrosion often occur when the filled batteries are stored prior to sale, such affected batteries become undesirable to purchasers.

One partial solution to the battery wicking problem is a Bi-Wax cup fitted onto the bushing underneath the lid. Such a device, a short tube with one end partially closed, is attached to the bushing using a greasy lubricant. Although acid wicking is prevented, this method is too expensive to be used commercially.

SUMMARY OF THE INVENTION

The general object of our invention is to provide a method by which liquid and vapor transmission through a plastic-substrate seal can be inhibited effectively and economically. Another object is to provide articles which contain plastic-substrate seals which are not susceptible to liquid and vapor transmission through such seals. Other objects appear hereafter.

We have found that these objects can be accomplished by a process comprising the steps:

a. powder coating a substrate with a polymer powder comprising from 25 to 100 parts by weight of a polyolefin and from 75 to 0 parts by weight of a polycarbonamide which is compatible with the polyolefin; and b. forming a plastic-substrate seal.

The preferred mixture in our invention comprises 25 to 90 parts of polypropylene and 75 to 10 parts of a polycarbonamide of a dicarboxylic acid having at least 18 carbon atoms. This corresponds approximately to a weight ratio of polyolefin to polycarbonamide of 1:3 to 9:1. In practice our invention may be employed in situations where a fluid may pass through a plastic-substrate seal. Our invention particularly is suited for situations where a plastic-substrate seal must maintain integrity over an extended period of time.

DETAILED DESCRIPTION OF THE INVENTION

Figure 1:
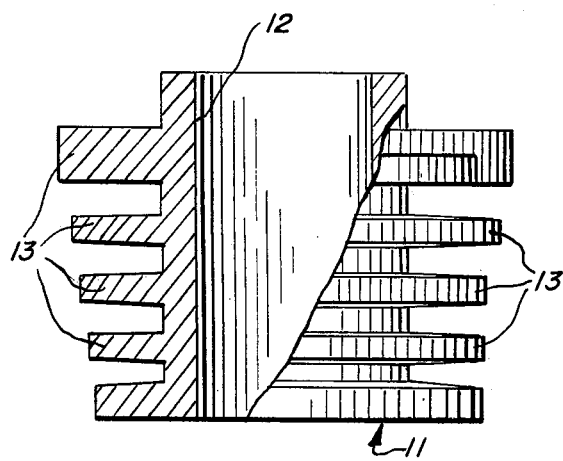
FIG. 1 depicts a battery terminal bushing.
Figure 2:
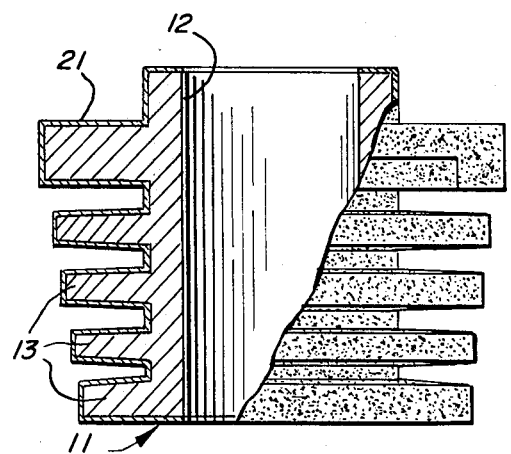
FIG. 2 depects a battery terminal bushing which has been powder coated with a composition described herein.
Figure 3:
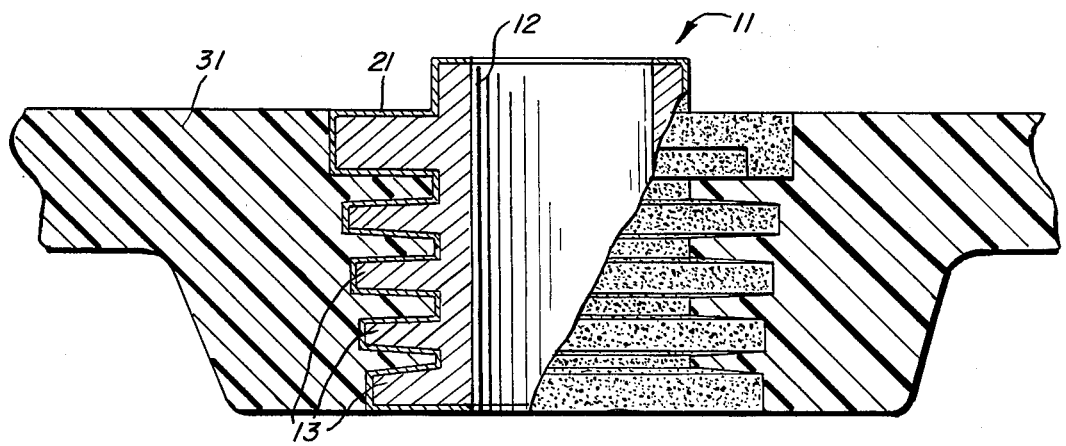
FIG. 3 shows a powder coated bushing imbedded in a plastic battery lid.

Generally, our invention inhibits liquid and vapor transmission through a plastic-substrate seal by powder coating the substrate with a polymer powder comprising polyolefin or polyolefin-polycarbonamide blend before forming the plastic-substrate seal.

By inhibition of liquid and vapor transmission we mean that when a liquid and/or vapor contacts one side of a treated plastic-substrate seal, no substantial amount of liquid and/or vapor will pass through the interface between the plastic and substrate as compared to an untreated seal exposed to similar conditions. If the liquid and/or vapor is corrosive and such material contacts one side of a seal, the extent of transmission through a seal can be observed by the extent of corrosion on or on the other side of the seal. The liquids and vapors of which transmission may be inhibited may be any liquid or vapor which does not substantially dissolve or disintegrate either the plastic, the substrate or the coating compositions useful in our invention. When the plastic is a polyolefin and the substrate is a metal, the transmission of water or aqueous solutions can be inhibited. The transmission of an aqueous sulfuric acid solution through a polypropylene-lead seal can be inhibited by our invention.

The useful substrates may be any solid material which may be powder coated with a polyolefin or a polyolefin-polycarbonamide blend. These include metals such as steel, lead, aluminum, tin-plated steel, zinc, chrome-plated steel, galvanized steel, copper, brass, bronze and the like; inorganic polymers such as glass or glass-like substances including ceramics; crystalline or partially crystalline materials and organic polymers. Our invention has been found to be effective especially for lead substrates.

The plastic material that forms the plastic-substrate seal may be any polymer capable of forming a seal with an above-mentioned solid substrate. Examples are polyethylene, polypropylene, polystyrene, high impact polystyrene, vinyl chloride polymers, ABS polymers, acrylic polymers, polyamides, etc. and copolymers and mixtures thereof.

The polyolefins useful in the coating composition in our invention are resinous polymers of vinyl monomers having up to 8 carbon atoms including resinous polymers of propylene and/or ethylene, such as substantially crystalline homopolymeric polypropylene, high density polyethylene, propylene-ethylene block, random or multi-segment copolymers, etc. Polymers of propylene containing at least 75% by weight propylene and particularly substantially crystalline homopolymeric polypropylene are preferred because these polymers have a relatively high melting point and are not sticky at slightly elevated temperatures. A polyolefin containing essentially 100% propylene has been used effectively.

The polycarbonamides useful in this invention are compatible with the polyolefin in the desired concentration range of polycarbonamide. By compatibility, we mean that the polycarbonamide and the polyolefin form a blend during fusion having substantially the same properties as a premelt blend of the polymers. For compatibility, the properties include good adhesion to substrate; a lack of peeling, blistering, flaking, discontinuities or pin holes; and the creation of a uniform, glossy film. A test for compatibility is to extrude a blend of two polymers and mold the product into a 100 mil thick plaque. If the plaque does not separate into layers or flake, the two polymers are compatible. We have found that polyolefin-compatible polycarbonamides incorporate long hydrocarbon chains such that the length of the chains between amide groups is on the average more than 10 and less than about 40 carbon atoms, but the minimum number of carbon atoms in any one chain should be about four. It is observed that the polycarbonamides designated as nylon 66 and nylon 6, which average less than 10 carbon atoms per hydrocarbon chain, are not compatible with polypropylene.

Polycarbonamides which are formed as the condensation product of long chain dicarboxylic acids (or acid derivatives) having from 18 to 72 carbon atoms with polyamines having at least two primary amino groups and having from 4 to 30 carbon atoms are compatible with polyolefins such as polypropylene and are useful in our invention. Polymers formed from dicarboxylic acids with 18 to 36 carbon atoms and diamines with 6 to 10 carbon atoms are preferred. Suitable dicarboxylic acids include, among others, alpha, omega-dicarboxyhexadecane and alpha, omega-dicarboxytetracosane, and the so-called dimer acids as described in U.S. Pat. No. 2,482,761. Suitable polyamines containing at least two primary amino groups include hexamethylene diamine, octamethylene diamine, decamethylene diamine, diethylene triamine, etc.

Similarly, polycarbonamides may be formed from longer chained diamines and shorter chained dicarboxylic acids as long as the average number of carbon atoms in the chains within the polymer exceeds ten. In another embodiment, the polycarbonamides may be condensation products of cyclic lactams or long chain amino acids (or acid derivatives) with hydrocarbon chains containing more than ten carbon atoms. The polycarbonamides designated as nylon 11, nylon 12 and nylon 13 have been found to be effective.

The polyolefins and compatible polycarbonamides useful in our invention are chosen such that their respective melting points occur approximately within the same range. Thus, when the blend is heat fused, a fusion temperature can be chosen above the melting point of both polymers but under the decomposition temperature of either component. Practically, the fusion temperature should be about 190° to 230°C.

The preferred polycarbonamides useful in this invention are based on the so-called dimer acids. Of these CrystalClad-Ep-2100 (available from General Mills Chemicals Corp.), a dimer acid/hexamethylene diamine polycarbonamide is recommended because it is available in small particle form and does not have to be cryogenically milled to obtain a useful particle size. This product is a white thermoplastic nylon powder with a softening temperature of 196° C (ASTM E-28, ring and ball). It has a specific gravity of 0.99, an index of refraction of 1.5180 (20° C), a tensile strength of 2800 psi., and elongation of 490%, a Shore hardness of 65 and a nitrogen content (Kjeldahl) of 6.82%. Analysis of hydrolyzed CrystalClad-EP-2100 showed that this product mainly consists of hexamethylene diamine and 36-carbon dimer acid. Also present are minor amounts of a 10-carbon dibasic acid and stearic acid with its near homologs.

In order to form a liquid and vapor resistant plastic-substrate seal, the substrate must be powder coated with a polyolefin such as polypropylene or a polypropylene-polycarbonamide blend. A preferable coating composition is a blend of from 25 to 90 parts polypropylene and from 75 to 10 parts polycarbonamide. A composition with from about 20 to 50 weight percent of polycarbonamide is especially effective. Economically, it is desirable to use as little polycarbonamide as possible because of its higher relative cost.

Blends of polypropylene and the preferred polycarbonamide adhere very well to most solid substrates, although the optimum polyolefin/polycarbonamide ratio may vary with the substrate used. For example, glass substrates require a higher proportion of polycarbonamides than do metallic substrates for optimum adhesion. It is observed that a polyolefin-polycarbonamide blend adheres to metal substrates much better than a pure olefin coating composition. In application within the scope of our invention there should be some adhesion between the coating and the substrate, although optimum coating adhesion to the substrate is not absolutely necessary. It is believed that the stronger the adhesion, the better is the effectiveness of the seal formed.

The polymer compositions useful in our invention are in the form of particles with a diameter of less than 250 microns and must be applied to the substrate by a method of powder coating. By this we mean any method which successfully deposits the polymer particles onto the substrate surface to form a continuous coating of sufficient thickness. The preferable method of applying these compositions to the substrate is to cover the substrate by electrostatically spraying the polyolefin or polyolefin-polyamide powder blend followed by heat fusing or baking the deposited particles at 190° to 230° C for 2 to 10 minutes to form a continuous coating. Alternatively, the substrate may be sprayed with a slurry (preferably aqueous) of the polymer composition and then heat fused. A typical bake cycle for these processes is 3 to 4 minutes at 200° C. Other time-temperature cycles can be used, as long as the temperature is high enough to melt the coating composition. The fusion temperature is critical since at lower temperatures the coating composition will be rough while at higher temperatures the coating will decompose. Another, but less preferable method of applying the composition is to dip a preheated substrate in a fluidized bed and bake for about 2 to 10 minutes at 190° to 230° C. Although the described methods of powder coating application have been employed successfully, any other effective powder coating method may be used. We have found that polymer composition coatings consisting essentially of polyolefin must be water quenched after the baking step in order to obtain optimal adhesion. Coatings of polyolefin-polycarbonamide blends need no such water quenching step and thus need to be air cooled only.

For use in powder coating, the polymer particles preferably should be less than 250 microns in diameter and most advantageously less than 150 microns in diameter. Larger particles tend to create a rough coating which would require longer heat fusion times. The polymer coating may range from about 0.25 to about 20 mils depending upon the substrate, but the thickness is not especially critical in preventing liquid transmission through a seal. A coating thickness of 1 to 10 mils has been found effective. Typically, the electrostatic spray method yields a thinner coating than do the other covering methods described. The coating composition useful in our invention can include from 0.1 to 2 parts of a zinc salt of a fatty acid (zinc stearate, zinc palminate, zinc oleate, etc.) per 100 parts of polyolefins as a curing agent and adhesion promoter. Stabilizers such a butylated hydroxytoluene (BHT) or distearylthiodipropionate (DSTDP) and pigments can be used in moderate amounts.

After the substrate is powder coated with the polymer composition, the substrate is contacted with a plastic material to form a plasticsubstrate seal. One example is to injection mold polypropylene about a metallic substrate.

One type of situation where our invention is useful exists when a plastic-substrate seal is contacted with a liquid through a wicking action, that is, where liquid is transmitted to the seal by surface forces. A specific example of this type exists in a lead-acid battery where polypropylene is injection molded about a lead bushing forming a polypropylene-lead seal. Typically, these bushings 11 are cylinders 12 with a plurality of ribs 13 circumferentially protruding therefrom. Through these bushings are inserted, battery terminal columns which protrude from the battery lid and extend downward to the battery plates. Usually there are two such terminals corresponding to the positive and negative battery posts. Although it is possible that the bushing and the terminal column could be constructed as a single unit, there would still be a plastic-lead seal within the scope of our invention. Further, it is possible that the terminals may extend laterally from the side of the battery case. In this situation we designate the lid as including the area of the case where the terminal bushings are located. When the battery is filled with acid the lower portion of the terminal column is immersed in acid (usually sulfuric acid). It is observed that battery acid will creep or "wick" up the terminal column and make contact with the seal between the terminal and the plastic lid.

In our invention, lead battery terminal bushings are covered with a powder coating 21, comprised of a polyolefin and preferably a polyolefin-polycarbonamide blend, after which a plastic (preferably polypropylene) lid 31 is molded about the bushings. We have found that a pure polyolefin coating such as polypropylene will inhibit acid transmission through the battery lid and thus prevent corrosion in more instances than without any coating. A polyolefin-polycarbonamide blend is even more effective and appears to prevent essentially all corrosion due to acid wicking. The latter compositions have an added advantage in that they need not be water quenched after the baking step of powder coating.

The following examples demonstrate but do not limit our invention.

EXAMPLES 1 TO 12

Four different coating compositions were prepared by mixing in a Waring blender various dry powder ingredients shown in TABLE I. The polypropylene (PP) powder used has a distribution of particles with diameters ranging from 5 to 75 microns with 60% of the particles having diameters between 35 to 50 microns. The polycarbonamide used is CrystalClad-EP-2100 (CC-EP-2100), a product of General Mills Chemical Corp., which contains particles as large as 100 microns in diameter with 20% of the particles having diameters of less than 5 microns and 50% of the particles having diameters between 10 and 40 microns. Other ingredients are stablizers such as BHT, DSTDP, and Q158 (a product of Argus Chemical Co. Which contains a bis-phenol, a phosphite and a zinc salt). Regal Medium Yellow, a chromate yellow pigment was used. The constituents of the coating compositions used in Example 1 to 12 are summarized in TABLE I.

TABLE I

| COATING COMPOSITIONS | |
|---|---|
| Example | Constituents |
| 1–3 | 100% PP |
| 4–6 | 95% PP |
| | 5% pigment |
| 7–9 | 66.4% PP |
| | 28.5% CC-EP-2100 |
| | 0.1% BHT |
| | 5% pigment |
| 10–12 | 66.1% PP |
| | 28.6% CC-EP-2100 |
| | 0.1% BHT |
| | 0.2% DSTDP |
| | 0.2% Q158 |
| | 4.8% pigment |

Twelve bushings for positive battery terminals were electrostatically sprayed with the coating compositions. The spraying was performed at room temperature with a DeVilbiss EPH-600 electrostatic spray system modified with a PFT-420 micro-feed powder cup and was continued until it appeared that the bushing was entirely covered with the composition. The coated bushings then were baked at 200° C in a hot convection oven for four minutes, after which, all bushings were air-cooled. The thickness of the coating was approximately 1 to 2 mils. Each of the bushings was incorporated into a polypropylene battery lid such that each lid in Examples 1 to 12 contained one coated positive terminal bushing and one uncoated negative terminal bushing. After the lids were plugged at the vent holes with rubber stoppers, a terminal post stub was inserted into each bushing such that a portion of the part extended on either side of the bushing.

The lids were mounted as level as possible in an inverted position, that is, the underside of each lid was facing up. In this configuration the structure of the lids formed a slight cavity. All positive terminals (anodes when charged) were connected with ⅛ inch diameter lead (Pb) wire. Additional ⅛ inch Pb wire was laid into each lid cavity and connected to the negative terminals, which become cathodic when charged. All lid cavities were filled full with sulfuric acid (specific gravity 1.260) such that all cathode wires and all terminal post-bushing interfaces were below the level of the acid. The Pb wires were connected to a constant potential power supply set for 2.50 volts. When after 65½ hours the specific gravity of the electrolyte was measured at 1.320. thirty milliliters of water were added with mixing to each cavity which returned the specific gravity of the electrolyte to 1.260. The test was stopped after 73 hours after which time the lids were emptied, washed and allowed to dry overnight. After drying, the lids were cut apart and each bushing was checked for corrosion. Those bushings which exhibited corrosion had signs of corrosion extending at least 1/16 inch from the bottom. The others had no signs of corrosion whatsoever. The results are tabulated in TABLE II.

TABLE II

| Example | Observed Corrosion coated bushing | uncoated bushing |
|---|---|---|
| 1 | yes | yes |
| 2 | yes | yes |
| 3 | no | no |
| 4 | yes | yes |
| 5 | yes | yes |
| 6 | no | yes |
| 7 | no | yes |
| 8 | no | yes |
| 9 | no | yes |
| 10 | no | yes |
| 11 | no | yes |
| 12 | no | yes |

In this test, the conditions to which the plastic-lead seal is subjected are more severe than are encountered in a battery under normal use since the seal is submerged in acid as opposed to contact through a wicking action. The results show that while polypropylene coated bushings are less desirable in this extreme test, the polypropylene-CyrstalClad-EP-2100 coated bushings completely inhibit liquid transmission through the lead-polypropylene seal. It is noted also that these polypropylene coated bushings were not cooled by water quenching.

EXAMPLES 13–22

These examples use dry blended powder compositions comprising polypropylene homopolymer containing 0.1% BHT having a particle size distribution similar to that specified in Examples 1–12 and a very minor amount of lead chromate yellow pigment. Twenty-four lead battery bushings were electrostatically sprayed with this composition at room temperature using a DeVilbiss EPH-600 electrostatic sprayer modified with a PFT-420 micro-feed powder cup at a voltage setting of 8. The coated bushings were baked in a convection oven for 4 minutes at 188° C. and then quenched in cool water. From 12 battery lids that were constructed by injection molding polypropylene about these coated bushings, ten lids were selected at random and fitted upon normal automotive batteries. These completed batteries were filled with acid and stored at room temperature. There was no sign of corrosion about any of the treated bushings after several months. Corrosion has been seen about untreated bushings stored under similar conditions for comparable time periods.

We claim:

1. A method of constructing a seal between a battery terminal bushing and a plastic lid comprising:
    a. covering the battery terminal bushing with a polymer powder blend formed from particles with diameters of less than 250 microns comprising from 25 to 100 parts by weight of a polyolefin selected from the group consisting of polypropylene, a polypropylene-polyethylene copolymer and blends thereof and from 75 to 10 parts by weight of a polycarbonamide which is compatible with the polyolefin;
    b. baking the covered bushing for 2 to 10 minutes at 190° to 230° C. to form a continuous coating;
    c. cooling the baked bushing; and
    d. molding plastic about the bushing to form a battery lid.

2. The method of claim 1 wherein the polycarbonamide is formed from a dicarboxylic acid having at least 18 carbon atoms.

3. The method of claim 2 wherein the plastic is polypropylene and is injection molded about the bushing.

4. The method of claim 3 wherein the bushing is made of lead.

5. The method of claim 4 wherein the polyolefin is polypropylene and the polycarbonamide is formed from a dimer acid and hexamethylene diamine.

6. The method of claim 5 wherein the polymer powder blend comprises 50 to 80 parts polypropylene and from 20 to 50 parts polycarbonamide.

7. The method of claim 6 wherein the powder blend is electrostatically sprayed onto the bushing.

8. The method of claim 7 wherein the blend if formed from particles with diameters of less than 150 microns in diameter.

9. A method of constructing a seal between a battery terminal bushing and a plastic lid comprising molding plastic about a battery terminal bushing, said bushing having been (a) covered with a polymer powder blend formed from particles with diameters of less than 250 microns comprising from 25 to 100 parts by weight of a polyolefin selected from the group consisting of polypropylene, a polypropylene-polyethylene copolymer and blends thereof and from 75 to 10 parts by weight of a polycarbonamide which is compatible with the polyolefin; (b) baked for 2 to 10 minutes at 190° to 230° C. to form a continuous coating; and (c) cooled.

10. The method of claim 9 wherein the plastic is polypropylene and is injection molded about the bushing.

11. The method of claim 10 wherein the bushing is made of lead.

12. The method of claim 11 wherein the polyolefin is polypropylene and the polycarbonamide is formed from a dimer acid and hexamethylene diamine.

13. The method of claim 12 wherein the polymer blend comprises 50 to 80 parts polypropylene and from 20 to 50 parts polycarbonamide.

14. The method of claim 13 wherein the powder blend is electrostatically sprayed onto the bushing.

15. The method of claim 14 wherein the powder blend is formed from particles with diameters of less than 150 microns in diameter.

* * * * *